Feb. 16, 1971 D. M. STERN 3,564,498

CHARACTER RECOGNITION SYSTEM

Original Filed Jan. 25, 1966 6 Sheets-Sheet 1

INVENTOR.
DAVID M. STERN
BY
Vincent L. Carney
ATTORNEY.

Fig. 2.
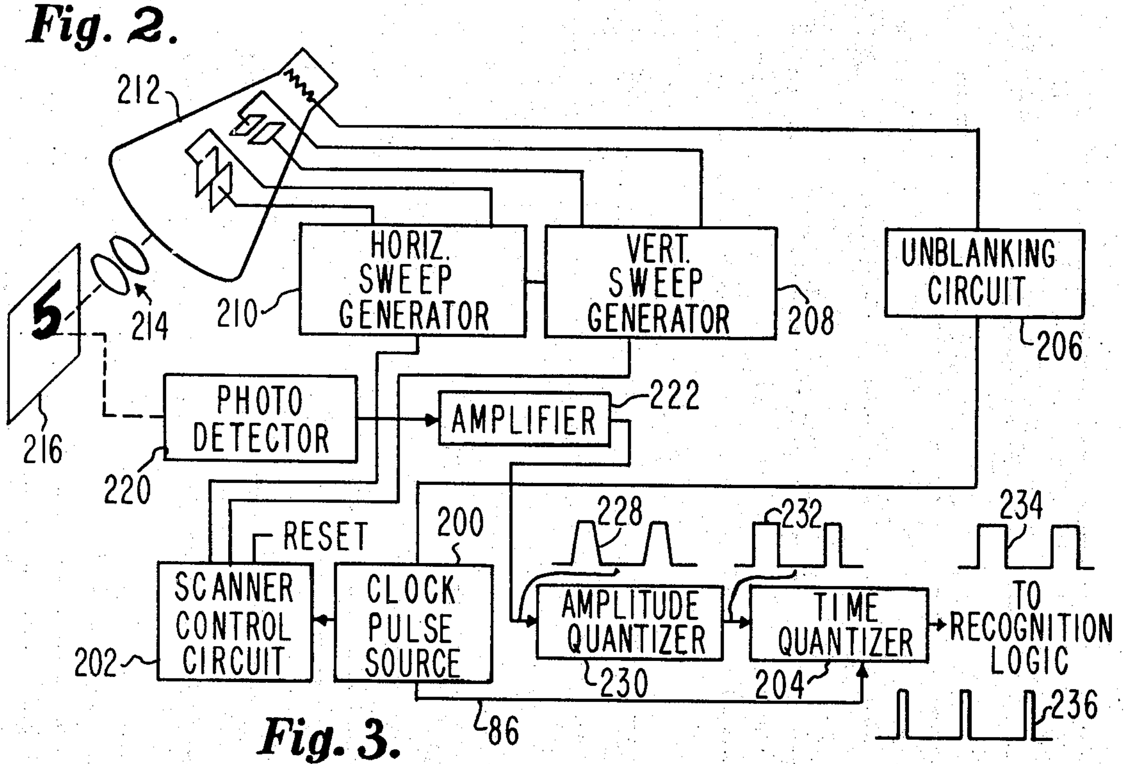
Fig. 3.
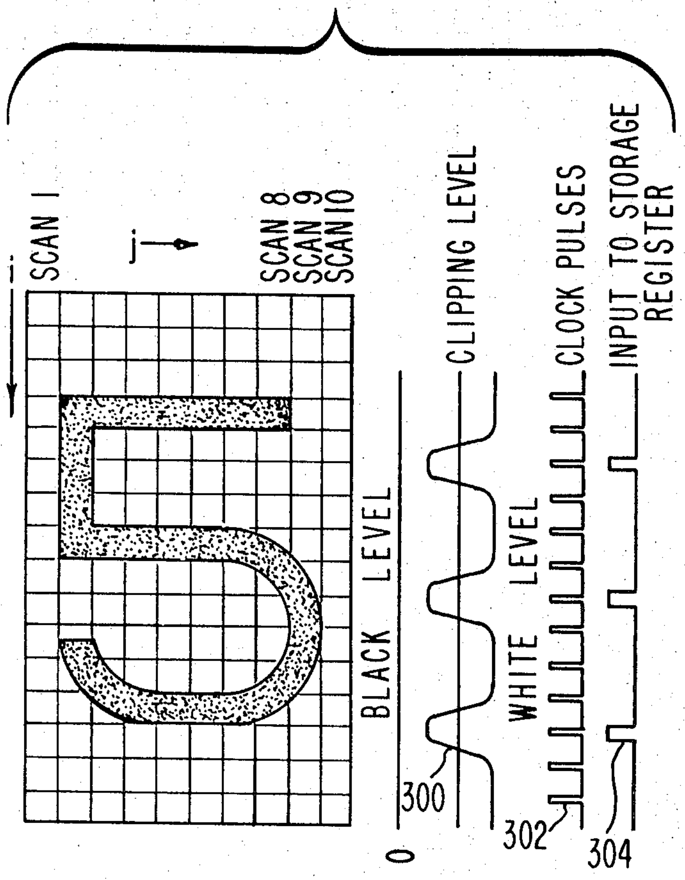
Fig. 4.
| | | | | |
|---|---|---|---|---|
| $A_{11}$ | $A_{12}$ | $A_{13}$ | $A_{14}$ | $A_{15}$ |
| $A_{21}$ | $A_{22}$ | $A_{23}$ | $A_{24}$ | $A_{25}$ |
| $A_{31}$ | $A_{32}$ | $A_{33}$ | $A_{34}$ | $A_{35}$ |
| $A_{41}$ | $A_{42}$ | $A_{43}$ | $A_{44}$ | $A_{45}$ |
| $A_{51}$ | $A_{52}$ | $A_{53}$ | $A_{54}$ | $A_{55}$ |
Fig. 5.
| | | | | |
|---|---|---|---|---|
| 1 | 0 | 0 | 1 | 0 |
| 0 | 1 | 1 | 0 | 1 |
| 1 | 0 | 1 | 1 | 0 |
| 0 | 0 | 1 | 1 | 1 |
| 1 | 1 | 1 | 0 | 1 |

United States Patent Office 3,564,498

Patented Feb. 16, 1971

3,564,498
CHARACTER RECOGNITION SYSTEM

David M. Stern, Merion Station, Pa., assignor to Burroughs Corporation, Detroit, Mich., a corporation of Michigan Continuation of application Ser. No. 522,916, Jan. 25, 1966. This application Oct. 31, 1969, Ser. No. 871,786
Int. Cl. G06k 9/12
U.S. Cl. 340—146.3 7 Claims

ABSTRACT OF THE DISCLOSURE

Apparatus for gating electrical signals from different combinations of neighboring ones of a few representative stages of a character recognition matrix shift register, the output of each of the gates being applied to the input terminal of a different auxiliary shift register which is shifted synchronously with the primary shift register. Each auxiliary shift register thereby stores a logical function of signals representative of neighboring areas of the character field that is examined.

This is a continuation of application Ser. No. 522,916, filed Jan. 25, 1966.

This invention relates to recognition networks, and more particularly, relates to recognition networks which classify incoming signals in a pattern recognition system into the type of pattern to which they most nearly correspond.

In pattern recognition apparatus, geometrical patterns are classified by obtaining energy signals representing the patterns and by comparing these signals to previously obtained information stored in the pattern recognition apparatus. Geometric patterns composed of magnetizable ink, for example, may be magnetized and scanned with a magnetic reader. Electrical energy that has been distributed by the magnetization of the pattern to represent the pattern is obtained by this scanning. Similarly, characters formed with ordinary ink may be scanned by a beam of light and electrical signals representing the patterns obtained from a light transducer in the path of light reflected by the pattern and its background.

Several techniques are available for comparing the signals obtained in this way with stored information to determine the nature of the pattern. One such technique obtains the cross-correlation of the transduced signal with each signal which a pattern recognition device is intended to recognize. In such a pattern recognition device, the cross-correlation may be performed by weighted resistor correlation matrices. Each such correlation matrix represents one pattern class of the plurality of pattern classes that the recognition device is intended to classify. A transduced signal representing each point in the scanned pattern is applied to a different resistor in each one of the correlation matrices. Each of the correlation matrices finds the sum of these signals after they are attenuated by the resistors. The resistors in each matrix correspond to the set of possible patterns which are intended to be recognized.

One such recognition system, called a Nearest Neighbor Correlation System, is disclosed in the United States patent application to C. K. Chow, Serial No. 209,007, filed July 11, 1962, now U.S. Patent No. 3,341,814 and entitled "Character Recognition." This application is assigned to the same assignee as the instant application. In this nearest neighbor recognition system a matrix of points on each pattern that is to be identified is established. A signal is obtained from each of these points of the matrix, which signal is either a binary "one" representing a location to which the pattern is superimposed on the background, or, a binary "zero" representing a location having only the background of the pattern. Since the nearest neighbor recognition technique is based on the assumption that the points of a pattern are interrelated, the products of signals from adjoining locations in the matrix are obtained. These products are then passed to especially designed matrices in which different weighted resistors combine in each matrix to analyse the pattern and the products of adjoining points of the pattern that is to be recognized.

In the nearest neighbor recognition system described in the above-identified application to Chow a large number of gating devices are necessary to interconnect adjoining points in the master matrix. With such a mechanization it is difficult to vary the type of neighborhood, or in other words, the choice of points in the matrix that are to be combined. Also, it may be inconvenient to provide the required number of gates. Accordingly, it is an object of this invention to provide an improved recognition mechanization.

It is a further object of this invention to provide a Nearest Neighbor recognition network requiring fewer gating devices.

It is a still further object of this invention to provide a flexible Nearest Neighbor recognition network which may be adjusted so as to consider different neighborhoods with ease.

In accordance with the above objects a pattern recognition system is provided in which a scanner obtains serially a matrix of information from the pattern, which matrix is in the form of binary "one" signals representing a location in which part of the pattern is present and binary "zero" signals representing the background of the pattern. These matrix signals are represented by "zero" and "one" states of a signal shift register. Binary signals from three specified points on the signal matrix shift register are connected to four separate AND gates to form the products required by the nearest neighbor method of analysis. The product formed by each of these AND gates constitutes the input signal for each of four separate shift registers which are distinct from and shorter than the signal matrix shift register. The parallel "one" and "zero" signals from the four product shift registers and from the signal shift register form the input signals to each of the resistor recognition matrices. They identify the incoming signals in the five shift registers as a pattern corresponding to the class of the network which provides the maximum output signal.

The nearest neighbor recognition method requires the compilation of the four logical products consisting of incident point and north neighbor, incident point and west neighbor, north neighbor and west neighbor, and incident point, north neighbor and west neighbor. Thus, with data being delivered serially to the signal matrix shift register three points located relatively early in this register are used in conjunction with the four nearest neighbor gates to generate the above mentioned four nearest neighbor products. These products will necessarily be generated serially (four at a time) and in synchronism with the matrix signals.

The invention and the above-noted and other features thereof will be understood more clearly and fully from the following description with reference to the accompanying drawings in which:

FIG. 2 is a block diagram of a scanning and video processing system which may be used in the invention;

FIG. 3 is a diagram illustrating the scanning of a number together with illustrative wave patterns which result from the scanning;

FIG. 4 is a diagram illustrating the signal matrix formed in an embodiment of this invention;

FIG. 5 is a diagram illustrating the signal matrix in quantized form as may be used in an embodiment of this invention;

Figure 1:
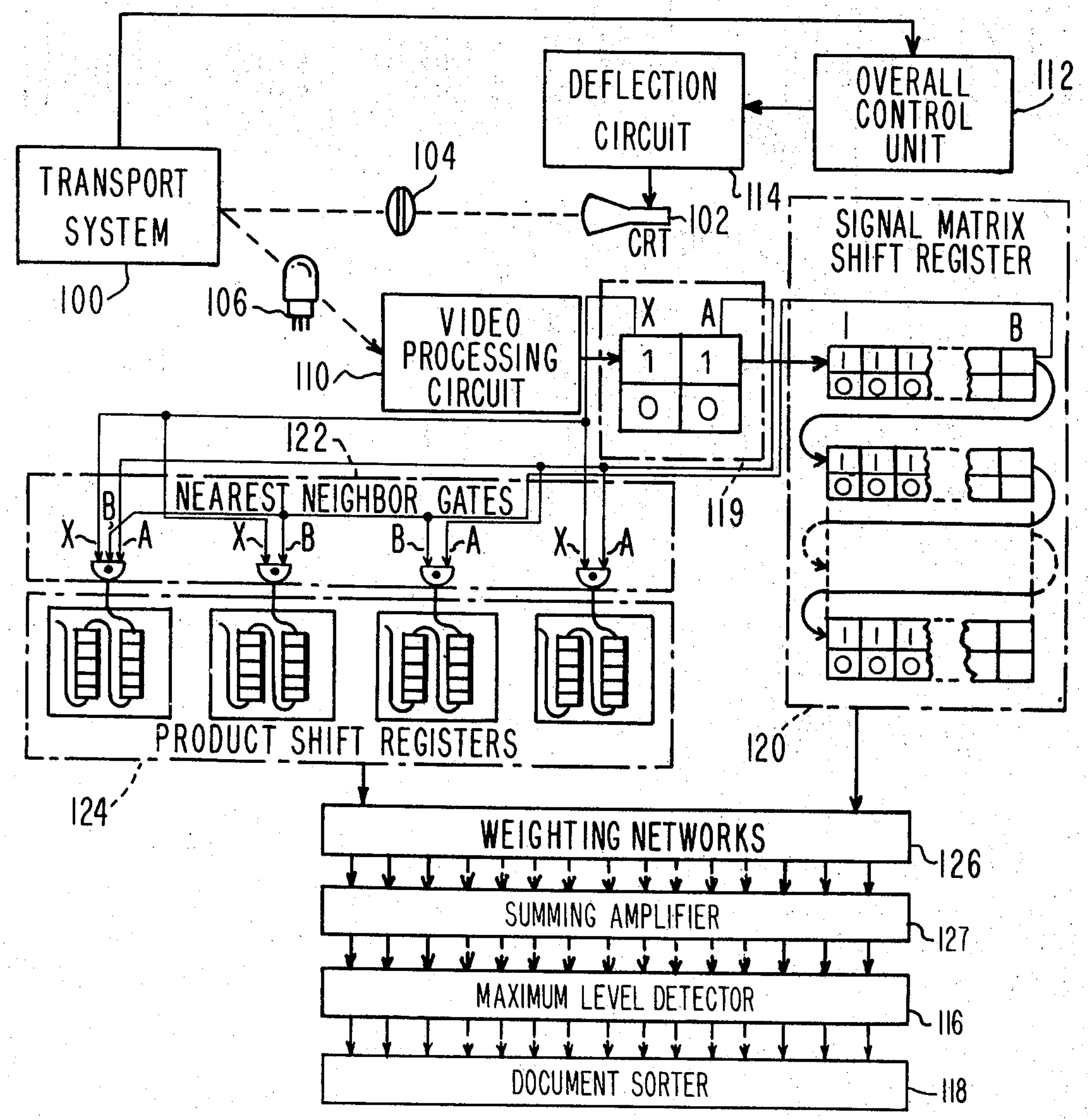
FIG. 1 is a block diagram of a pattern recognition system embodying the invention.

In FIG. 1 a block diagram of a pattern recognition device including an embodiment of the invention is shown having a document transport system 100 for sequentially picking documents from a stack and transporting them past the reader. A scanning system including the cathode ray tube 102 scans the document on the document transport system 100 through an optical system 104. The light reflected from the document varies in intensity as it passes over printing. This light is reflected onto the phototube 106. In response to the variations in light, the phototube 106 provides electrical signals to a video processing circuit 110, which, in turn, provides binary electrical signals that vary in a pattern representing the inked pattern on the document being scanned.

An overall control circuit 112 receives signals from the document transport system 100 and effectively synchronizes the cathode ray tube deflection circuit 114, the symbol decision circuit 116 (maximum level detector) and the actuator 118 of a document sorter. When the deflector circuit 114 receives a signal from the overall control circuit 112 indicating the presence of a document, it causes the cathode ray tube 102 to scan the document in a raster pattern. The video processing circuit 110, upon receiving a scanning signal from the deflection circuit 114, quantizes the variations in electrical signals from the phototube 106 into pulses representing binary "ones" and binary "zeros" and passes these pulses to the video storage flip-flops 119. This two-bit shift register stores video pulses just prior to their entry into the signal matrix shift register 120 and serves as a convenient source of signals X, and A for the nearest neighbor product gates 122. The nearest neighbor product gates utilize signals X, A and B as indicated to generate products which are serially transferred into the four product shift registers 124. The shifting rate in the registers 120 and 124 is equal, allowing pulses entered into the five registers to maintain a fixed geometric relation to each other. The availability of signals X and A from register 119 permit the convenience of the product terms being entered into position 1 of their respective register at the same time that the index pulse is being entered into position 1 of the signal matrix shift register 120.

The signal matrix shift register 120 forms a matrix of binary "ones" and binary "zeros" in which the binary "one" signals represent locations on the document containing printing and the binary "zero" signals represent the background of the document. Several points in the video storage matrix are electrically connected to the nearest neighbor gates 122 which simultaneously form products of the binary signals stored in this matrix and pass them to the nearest neighbor matrices 124. The signal matrix 120 and the product registers 124 are electrically connected to the weighting networks 126, and to summing amplifiers 127, the latter acting to sum the currents furnished thereto by the weighting resistor matrices. Each of the weighting networks 126 represents one of the decision classes 0 through 9 and space, in the example given.

If the signals being scanned corresponding to one of these numbers, the corresponding weighting network provides a greater output than any of the other weighting networks. These networks are connected to the maximum level detector 116 through individual lines. The decision circuitry 116 determines which line has the maximum signal and causes the document sorter 118 to act accordingly.

In FIG. 2 a block diagram of the scanner and video processing system is shown in which a clock pulse source 200 provides synchronizing pulses to the scanner control circuit 202, to a time quantizer 204, and to a cathode ray tube unblanking circuit 206. The scanner control circuit 202 provides signals to the vertical sweep generator 208 and to the horizontal sweep generator 210. The vertical sweep generator 208, the horizontal sweep generator 210, and the unblanking circuit 206 are electrically connected to the vertical deflection plates, the horizontal deflection plates, and the electron gun of a cathode ray tube 212 respectively and cause the beam on the surface of the cathode ray tube to sweep a vertical raster so that a beam of light is focused through an optical system 214 sweeping across the document 216 in a vertical raster.

As this beam sweeps across the document 216, the reflected light is passed to the photodetector 220. This reflected light has been modulated by the printing on the document, which is shown as a number "5." The output from the photodetector 220 is amplified by the amplifier 222 to provide a series of pulses 228, containing black video indications of printing. The output signals 228 from the amplifier 222 are passed to the amplitude quantizer 230.

The amplitude quantizer 230 contains threshold devices which generate rectilinear black video signals 232 whenever the input pulses 228 are above a fixed threshold level. The time quantizer 204, which receives the signals 232, generates output signals 234 of fixed widths and heights at periodic time intervals whenever it receives a black video signal. The intervals at which these pulses are produced are controlled by clock pulses 236 from a clock pulse source 200, which are applied to the time quantizer 204 several times during each of the vertical sweeps; the vertical sweeps are controlled by the vertical sweep generator 208 in response to slower clock pulses from the clock pulse source 200. Between vertical sweeps the horizontal sweep generator 210 steps the beam of light in a horizontal direction. In this way the output pulses 234 describe the presence of ink or no ink on the document covering a raster of several scans. This scanning system and video processor is described in more detail in the above-identified application to C. K. Chow.

In FIG. 3 a printed letter "5," which is to be scanned, is shown superimposed upon a ten by sixteen matrix having a vertical axis indicated by the letter "*i*" and a horizontal axis indicated by the letter "*j*." This matrix indicates how the matrix of binary signals representing the printed letter is obtained by the scanner and video processing system. The cathode ray tube scans along the "*i*" axis starting at the upper left hand corner and proceeding downward as indicated by the legend "scan 1." It makes ten such scans. Since less light is reflected to the photocell 220 by the printing than by the background, the photodetector 220 provides a signal 300 in which the printing is indicated by a voltage close to ground and the background is represented by a more negative signal.

During each scan down the "*i*" axis, 16 clock pulses are applied to the time quantizer 204 by the clock pulse source 200. These clock pulses 302 are applied to an AND gate with the black video signals 300 to form the signals 304 which provide an indication of printing or no printing at 16 areas during each of the ten scans. A black video pulse indicates the presence of printing at that point in the scan in which one of the 16 clock pulses has been applied to the time quantizer 204. The black video signals 304 are stored in a matrix indicated as 120 in FIG. 1.

In FIG. 4 a diagrammatic sketch of such a matrix is shown in which the incoming signals are represented by a capital "A" with a two-digit subscript indicating its position in the matrix. Since the signals are in binary form they may be represented as shown in FIG. 5 in which the signal $A_{11}$ is a binary "one" signal indicating the presence of ink, the signal $A_{12}$ is a binary "zero" signal indicating a background at that point, and so on.

In the nearest neighbor recognition system, not only is each individual point in the matrix of significance in representing the character to be recognized, but the relationships between the points are also of significance. For example, the product of the point $A_{11}$ and the point $A_{12}$ is indicative of the character to be recognized. It is believed that every point on the matrix is related to every other point. However, to reduce hardware, only two adjacent points are considered in this embodiment and in the embodiment of the above-identified application to Chao K. Chow.

Figure 6:
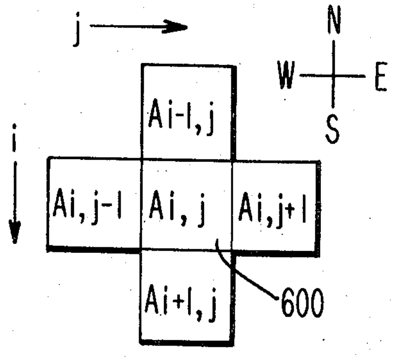
FIG. 6 is a diagram of a point in a signal matrix and its nearest neighbors as is used in an embodiment of this invention.

In FIG. 6 a diagram of five points in the matrix is shown in relation to the axes "*i*" and "*j*" which are used in FIG. 3. The direction of the "*i*" axis will be spoken of as "south" and its opposite direction as "north"; the direction of the "*j*" axis will be spoken of as "east" and its opposite direction as "west." An index point 600, which may be any point in the matrix, is designated "$A_{ij}$." Accordingly, its north neighbor is considered as $A_{i-1,\,j}$ and its south neighbor as $A_{i+1,\,j}$ the west neighbor is designated as $A_{i,\,j-1}$; and the east neighbor as $A_{i,\,j+1}$. In the embodiment described in this application and in the above-identified application to Chao K. Chow, each point A of the matrix is considered individually and the combination of each point $A_{i,\,j}$ with its north neighbor $A_{i-1,\,j}$ and with its west neighbor $A_{i,\,j-1}$ are considered. Also the product of the north neighbor $A_{i-1,\,j}$ and the west neighbor $A_{i,\,j-1}$ are considered and the product of the point $A_{i,\,j}$ with both its north and west neighbors are considered.

Figure 7:
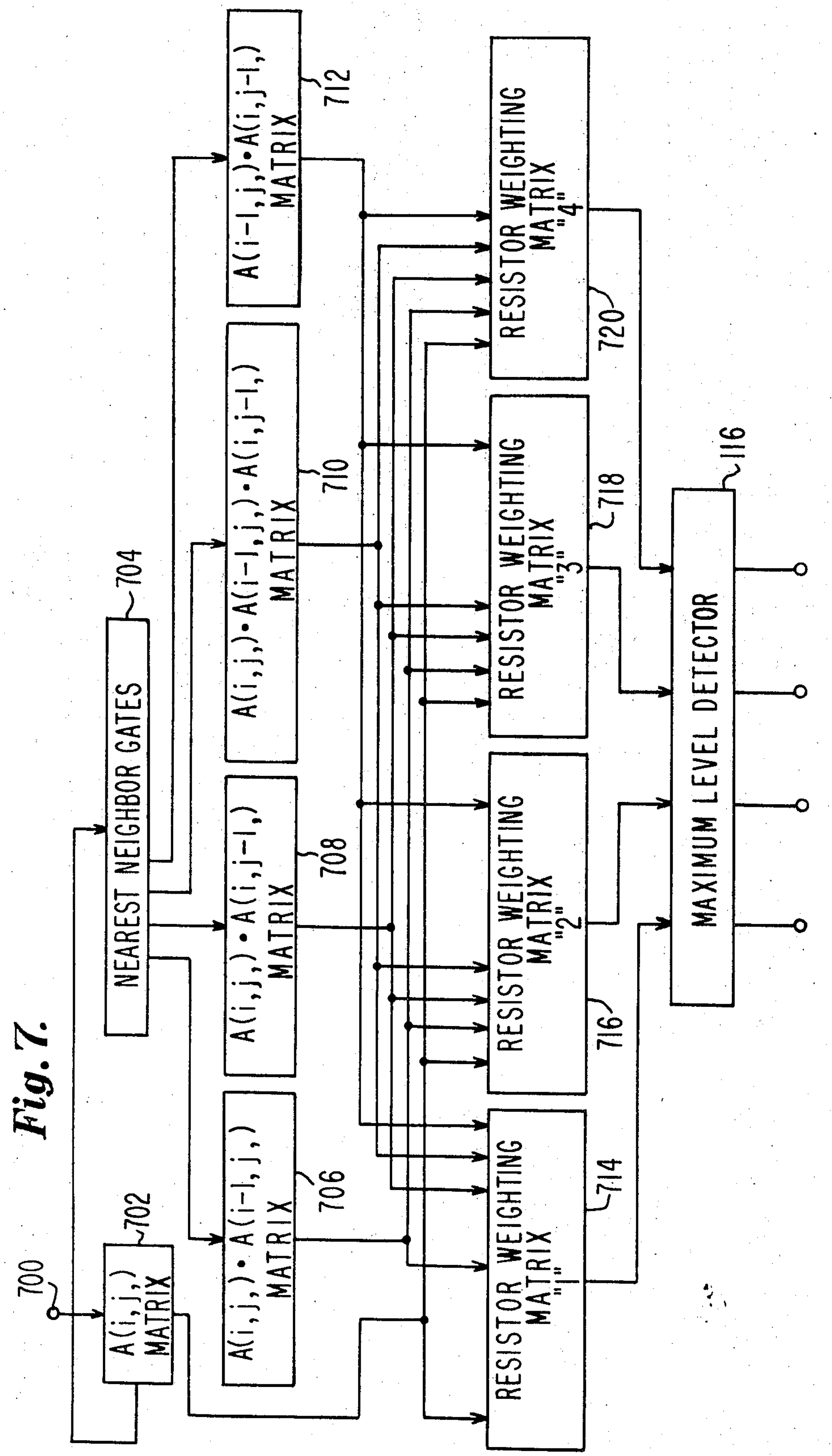
FIG. 7 is a block diagram illustrating the correlation system of an embodiment of this invention.

In FIG. 7 a method of combining these neighbors which is economical of AND gates and in which it is possible to change neighborhoods is shown. In this system it is convenient to change the neighborhood from, for example, the north and west neighbors to the east and south neighbors or to neighbors that are further removed than the adjacent points.

The binary video signals from the video processing unit 110 are applied to the terminal 700 shown in FIG. 7. This binary information is then stored in a matrix which may be composed of shift registers connected in series. This matrix is designated as $A_{i,\,j}$ matrix 702. One of the outputs from this matrix is electrically connected to the nearest neighbor gate 704, which form the products of the neighboring points in the signal matrix. The nearest neighbor gates 704 are electrically connected to the four matrices 706, 708, 710, and 712, which store the products of each point and its north neighbor, each point and its west neighbor, each point and both its north and west neighbor, and the north and west neighbors each point respectively.

Each of the five matrices 702, 706, 708, 710, and 712 is electrically connected to each of the resistor weighting networks 714, 716, 718, and 720, which weight the incoming signal in accordance with a priori probability of its representing symbols 1, 2, 3 and 4, respectively. Of course, these four weighting matrices are only provided as examples and any such recognition device may be used instead. These recognition matrices may be weighted point resistor matrices such as those that are described in the above-identified application to Chow and in the article "A Recognition Method Using Neighbor Dependence," by C. K. Chow, IRE Transactions on Electronic Computers, vol. EC–11, No. 5, October 1962. The output from the weighting matrices is electrically connected to the maximum level detector 116, which circuit indicates the matrix having the largest output voltage. This output identifies the pattern which is to be recognized. A maximum determining circuit suitable for this use is described in the patent to Sheaffer, Jr., et al., No. 3,103,646, and entitled "Voltage Comparison Circuit."

Figure 8:
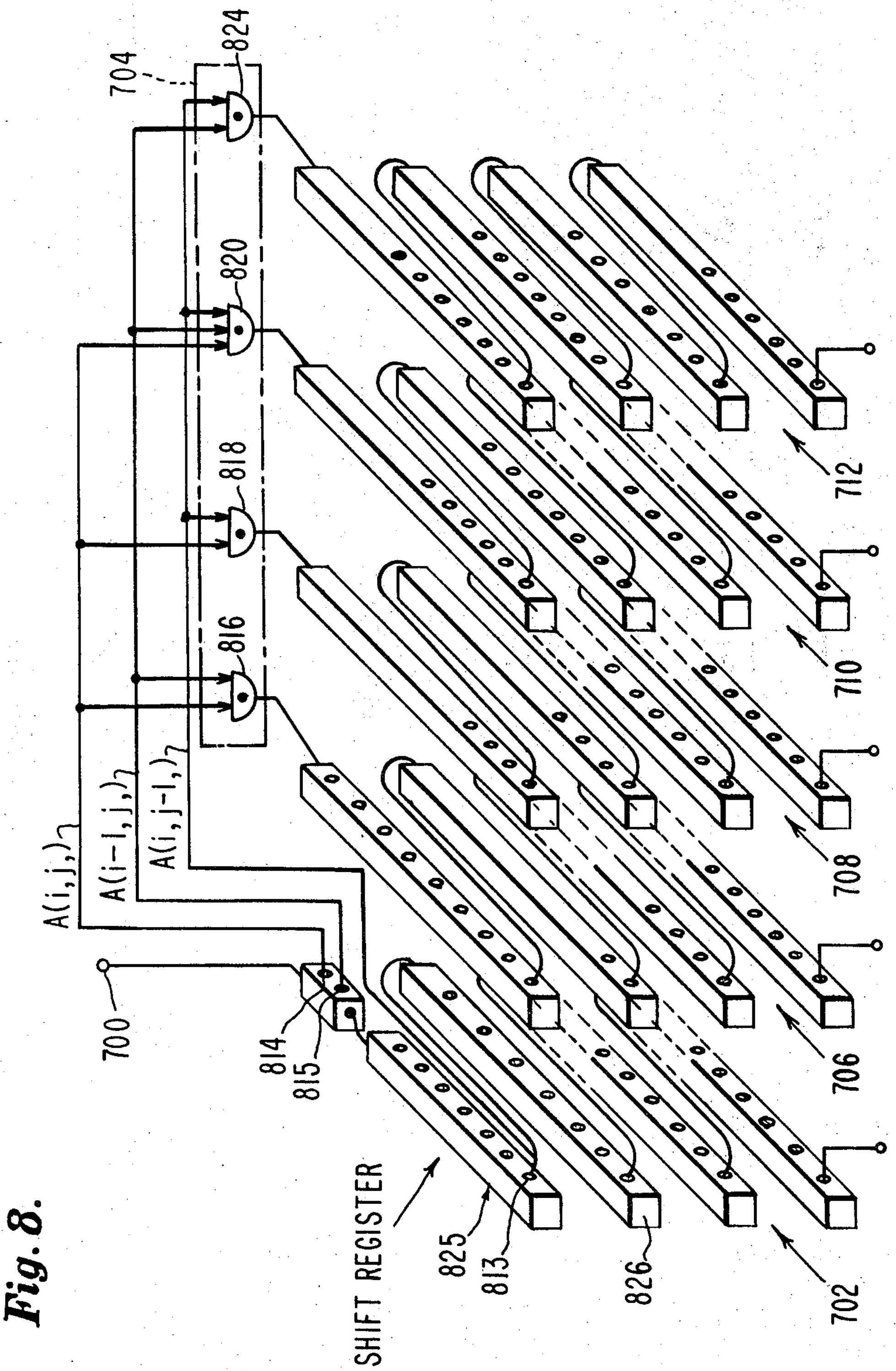
FIG. 8 is a block diagram illustrating a portion of the correlation network utilized in an embodiment of this invention.

A diagrammatic sketch of the storage matrices 702, 706, 708, 710 and 712 and of the nearest neighbor gates 704 is shown in FIG. 8. The binary signals from the video processing unit indicated as 110 are applied to terminal 700 and are stored in the shift register matrix 702. The first two storage positions in the shift register matrix 702 are obtained from a separate register having a first output tap 814 and a second output tap 815. The first output tap 814 is electrically connected to one of the inputs of the AND gate 816 in the nearest neighbor gating section 704, to one input of the AND gate 818, and to one of the three inputs in AND gate 820. The second output tap 815 of the first shift register in the matrix 702 is electrically connected to the other input of the AND gate 816, to a second of the three inputs of the AND gate 820, and to the other of the two inputs of the AND gate 824. The last tap 813 in the first shift register of the shift register matrix 702 is electrically connected to the input of the second shift register 826 of the shift register matrix 702. The output tap 813 on the first shift register of the matrix 702 is electrically connected to the other input of the AND gate 818 to the third input of the AND gate 820 and to the other input of the AND gate 824.

Since the cathode ray tube scans from the upper left character-position of the character, it sweeps first from $A_{11}$ through $A_{51}$ as shown in FIG. 4, returns to $A_{12}$ and goes through $A_{52}$ and so on. The signal at tap 814 is therefore the northern, nearest neighbor of the signal at tap 815 and the signal at the tap 813 is the eastern neighbor of the signal at the tap 815, with respect to the pattern of FIG. 3.

As soon as the second binary signal has been fed into terminal 700, the AND gate 816 provides a signal to the fourth shift register in the shift register matrix 706 indicating the product of the point at tap 815 and its northern neighbor at tap 814. When the sweep completes one scan and reads the signal $A_{12}$ into terminal 700, the AND gate 824 reads a signal into the first output terminal of the first shift register in the matrix 712 indicating the product of the point at 815 and its eastern neighbor 813. At the same time the AND gate 820 provides a signal to the first shift register of a matrix 710 indicating the product of the point at tap 815, its northern neighbor at point 814 and its eastern neighbor at tap 813, and the AND gate 818 provides a signal to the third shift register of the matrix 708 indicating the product the northern neighbor 814 of the information at tap 815 and the eastern neighbor 813 of the signal at tap 815.

Until a full scan has been read into the first shift registers of the matrices 702 and 706 binary "zeros" are read into the matrices 708, 710 and 712 since there are no signals for AND gates 818, 820 and 824 from the tap 813 in the first shift register 825 of the first matrix 702. In actual practice however, this causes no problems since the scanning is continuous across a string of numbers. It is only necessary that the proper output taps from the shift registers in the matrices 702, 706, 708, 710 and 712 be connected to the resistors in the proper weighting matrices. While for purposes of explanation it has been stated that one shift register stores the information from one scan, in actual practice this does not have to be true, and by proper placement of the connections to the AND gates a different number of shift registers or parts of shift registers per scan can be used. Also, the information from the scan does not have to be read directly into the terminal 700 but only that portion of the scan containing black video information may be used and the rest discarded.

Figure 9:
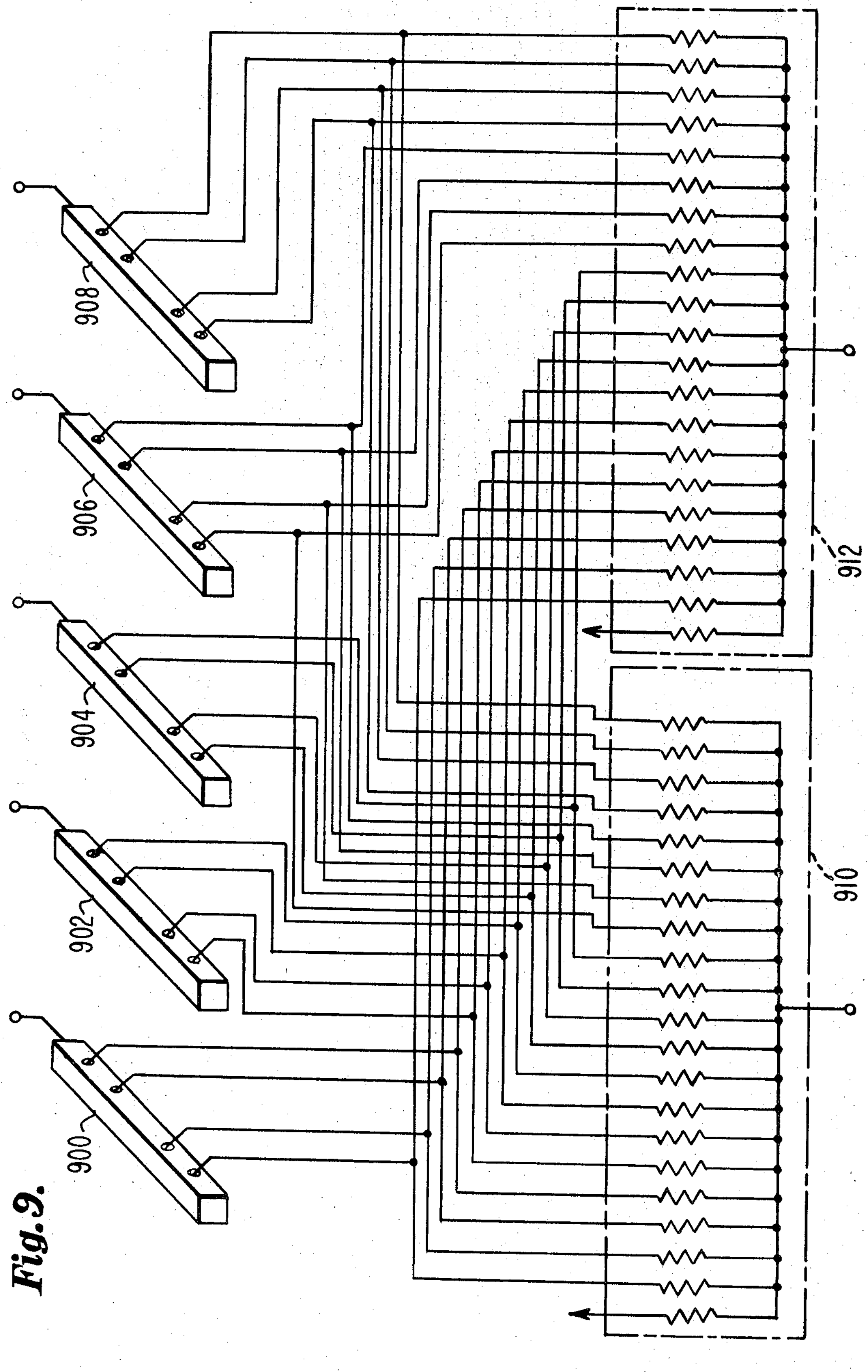
FIG. 9 is a block diagram of a second portion of the correlation network which is used in an embodiment of the invention.

In FIG. 9 five shift registers 900–908 are shown, each representing a shift register in a corresponding one of the matrices 702, 706, 708, 710, and 712. Each of the output taps in each of the five shift registers 900–908 may be electrically connected to each of the resistor weighting matrices shown as 714–720 in FIG. 7. Two such matrices 910 and 912 are shown in FIG. 9. It can be seen that each tap of the shift registers is electrically connected to one resistor in each weighting matrix. Some taps may be omitted because their contribution to the recognition of the character is negligible. The resistors are weighted in value according to the method described in the above-identified paper to Chao K. Chow and in his corresponding patent application. While only the connections from one shift register in each of the shift register matrices are shown in FIG. 9, it is understood that each output tap in each of the other shift registers may also be connected to a resistor in the correlation matrices.

Each of the shift registers 900–908 have a positive tap and a negative tap for each stage in the illustrated embodiment. The positive taps and negative taps are connected to different groups of resistors to form the recognition matrices. The use of both outputs of each of the flip-flops for a shift register is illustrated in the above-mentioned application to Chow.

Figure 10:
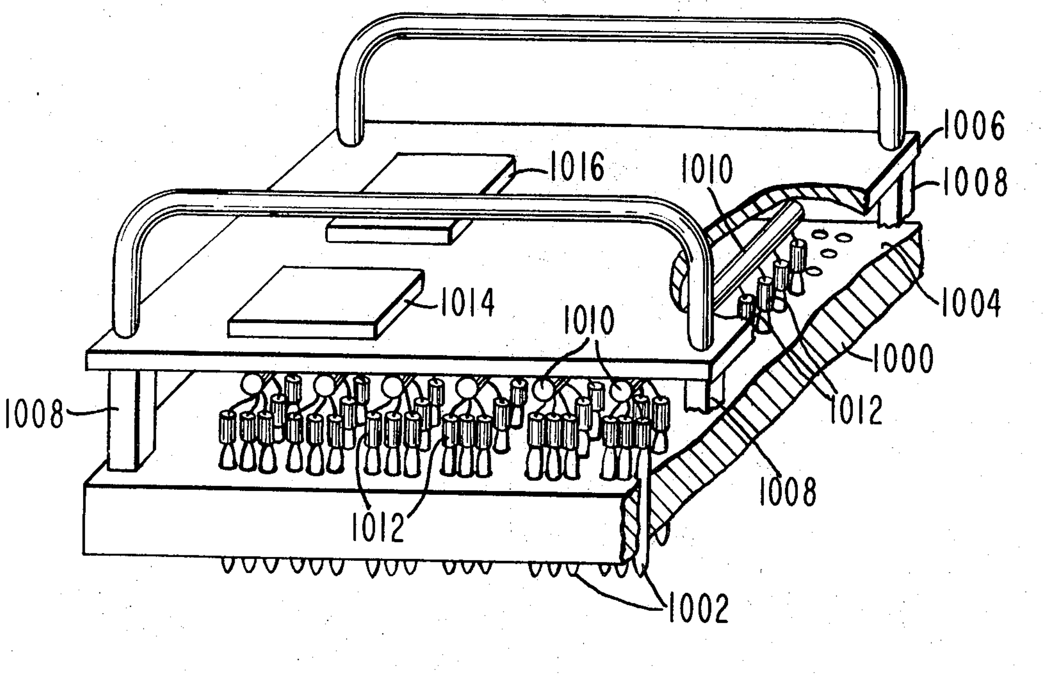
FIG. 10 is a perspective drawing with a broken section illustrating the mounting means for the resistor recognition matrices used in an embodiment of the invention.

In FIG. 10, a convenient packaging technique for the resistor matrices is illustrated. With this packaging technique recognition matrices are mounted on individual plugboards so that they may be conveniently changed. The recognition matrices and the associated amplifiers are mounted on removable male portions of the plugboards so that the resistors of the weighting networks have one end electrically connected to the male prongs of the plugboard. The male portion of the plugboard is then inserted into the female portion which contains the outputs from the shift registers.

The male portion of the plugboard contains a base plate 1000 having a plurality of prongs 1002 on its bottom side. These prongs 1002 are to be inserted into the female portion of the plugboard in such a manner that each of the prongs 1002 forms an electrical connection with one output tap of one of the shift registers. The prongs 1002 pass through the base plate 1000 of the plugboard and protrude from its top side 1004. A front mounting plate 1006 is mounted on the top portion 1004 of the base 1000 by four mounting posts 1008 which rigidly hold the front mounting plate 1006 a short distance away from the base plate 1000 of the plugboard.

The bottom side of the front mounting plate 1006 of the plugboard contains a plurality of elongated conductive busses 1010, each of which stretches from one edge of the front mounting plate 1006 of the plugboard to the opposite edge of the front mounting plate 1006 of the plugboard. The resistors 1012, which comprise together the weighting networks that are mounted on the plugboard, are each connected at one end to one of the pins 1002 that protrude through the base plate 1000 of the plugboard and are connected at the other end to one of the busses 1010.

The negative busses 1010 are each electrically connected to the input of an amplifier 1014 that is mounted on the top side of the front mounting plate 1006 of the plugboard. The amplifier 1014 is an operational amplifier. It has a resistive feedback network so that it forms an adder in a manner well known in the art. The output from the amplifier 1014 is connected to a maximum storage circuit 1016. This stored signal is used to make the necessary comparison in the maximum level detector 116 (FIG. 1).

It can be seen that this method of generating the nearest neighbor signal in a character recognition system provides flexibility and economy in the use of AND gates. The generation of the nearest neighbor signals directly from a signal register and the storage of these signals in separate matrices makes it possible to change the neighborhood being considered simply by changing the connections to the master assembly matrix and the AND gates. Only one AND gate is necessary for the consideration of each neighboring point whereas AND gates would have to be connected between every point and its particular neighborhood if provision were not made for the storage of the neighborhood signals separately.

Of course many variations and modifications in the invention are possible in the light of the above teachings. It is therefore to be understood that within the scope of the appended claims the invention may be practiced otherwise than as specifically described.

What is claimed is:

1. Apparatus in a character recognition system for detecting different combinations of a plurality of input signals, comprising:

transducer means, for generating a series of discrete electrical signals corresponding to said plurality of input signals;

first storage means, electrically connected to said transducer means, for successively storing said discrete electrical signals;

said first storage means being adapted for the sequencing of said discrete electrical signals through said first storage means as subsequent discrete electrical signals are successively stored;

said first storage means having a plurality of output terminals from which said plurality of stored signals may be sensed in parallel;

second storage means for storing a plurality of signals;

said second storage means having at least one input terminal and having at least one output terminal from which said plurality of signals may be sensed;

logic means, electrically coupling a selected subcombination of said output terminals of said first storage means to said at least one input terminal of said second storage means, for applying to said second storage means signals representative of a logical function of a selected subcombination of said successive discrete electrical signals stored in said first storage means;

said second storage means being adapted for the sequencing of said logical function signals through said second storage means in synchronism with the sequencing of one of said discrete electrical signals of said subcombination through said first storage means;

a plurality of weighting means, each having a plurality of input terminals and output terminals, for changing the magnitude of signals applied to its input terminals in accordance with the values of a plurality of transfer-function means electrically connected between its input terminals and output terminals;

each of said transfer-function means having a value such that the distributions of values for different weighting means represent transfer-functions related to different specific combinations of input signals;

one of the output terminals of said first storage means and each output terminal of said second storage means being electrically connected to the input terminal of a different one of said transfer-function means for applying both the discrete electrical signals and said logical function representing signals to said weighting means for the detection of said different combinations of the input signals; and a different summing means electrically connected to said output terminals of each weighting means, for providing an output signal which is a weighted function of the signals appearing at the input terminals of said weighting means, said output signal indicating the degree of correspondence between said different combinations of the input signals and a specific combination of input signals.

2. Apparatus for detecting different combinations of a plurality of input signals in accordance with claim 1 in which:

each of said transfer-function means comprises a resistor; and said summing means comprises an adder means providing the output signal correlation between said different combinations of the input signals and said transfer-function means.

3. Apparatus for detecting different combinations of a plurality of input signals in accordance with claim 1 in which said logic means comprises a plurality of logical AND gates having inputs selectively connected to different subcombinations of the output terminals of said first storage means and having outputs electrically connected to the input terminals of said second storage means, and said second storage means comprises a plurality of signal storage means each having an output terminal electrically coupled to different ones of said transfer-function weighting means.

4. Apparatus for detecting different combinations of a plurality of input signals in accordance with claim 1 in which said transducer means comprises scanning means for scanning said patterns; and quantizing means, electrically connected to said scanning means, for producing at selected intervals a binary "one" signal when said scanning means senses portions of said pattern and for generating binary "zero" signals when said scanning means senses a background of said pattern rather than said patterns.

5. Apparatus for detecting different combinations of a plurality of input signals in accordance with claim 2 in which said summing means includes a maximum-detecting means, electrically connected to said adder means for indicating which of the weighting networks has the largest output signal, whereby said character being scanned may be identified.

6. Apparatus for detecting different combinations of a plurality of input signals in accordance with claim 1 in which said weighting networks contain weighting resistors electrically connected at one end to the output terminals of said first and second storage means and having values representative of the statistical probability that the adjacent points on said scanned character will provide a binary "one" for the character represented by said weighting network.

7. Apparatus in accordance with claim 2 in which said first storage means comprises:

shift register means, electrically connected to said quantizing means, for storing said binary "one" and binary "zero" signals, whereby the output terminals of said shift register means form a raster representing said scanned pattern in the form of binary "one" and binary "zero" signals;

a second shift register means for storing binary signals;

a third shift register means for storing binary signals;

a fourth shift register means for storing binary signals;

a fifth shift register means for storing binary signals;

said logic means having a first of said AND gates with one of its two inputs electrically connected to the first output of said first shift register means and its other input terminal electrically connected to the second output tap of said first shift register means;

the output terminal of said first logical AND gate being electrically connected to the input of said second shift register means, whereby said second shift register means stores signals in the form of a raster representing the relationship between each point of said pattern and a first neighboring point;

said logic means having a second of said AND gates with one of its two input terminals electrically connected to the first output terminal of said first shift register means and its other input terminal electrically connected to the output terminal of said first shift register means that is storing the binary signal which occurred one complete scan before the signal in the first output terminal of said first shift register means;

the output terminal of said second logical AND gate being electrically connected to the input of said third shift register means, whereby said third shift register means stores signals which represent the combination of each point in said pattern and other neighboring points;

said logic means having a third of said AND gates with one of its three inputs electrically connected to the first input terminal of said first shift register means, with a second of its three input terminals electrically connected to the second output terminal of said first shift register means and its remaining input terminal electrically connected to the output terminal of said first shift register means which is storing the signal contained one full scan before the signal in said first output terminal of said first shift register means;

the output terminal of said third logical AND gate being electrically connected to the input of said fourth shift register means, whereby said fourth shift register means stores signals which are a combination of each point in said pattern with two of its neighboring points;

said logic means having a fourth of said AND gates means with a first of its two input terminals electrically connected to the second output terminal of said first shift register means and its other input terminal electrically connected to the output of said first shift register means which is storing the signal that was obtained one full sweep before the signal stored in said first output terminal;

the output terminal of said fourth logical AND gate being electrically connected to the input terminal of said fifth shift register means, whereby said fifth shift register means stores signals forming a raster representing the combination of two neighboring points of each point in said pattern;

each of the output terminals of said first, second, third, fourth and fifth shift register means being electrically connected to a different resistor in each of said weighting networks of said plurality of weighting networks.

References Cited

UNITED STATES PATENTS

| | | | |
|---|---|---|---|
| 3,234,513 | 2/1966 | Brust | 340—146.3 |
| 3,196,399 | 7/1965 | Kamentsky | 340—146.3 |
| 3,223,973 | 12/1965 | Chatten | 340—146.3 |
| 3,209,328 | 9/1965 | Bonner | 340—146.3 |
| 3,341,814 | 9/1967 | Chow | 340—146.3 |

MAYNARD R. WILBUR, Primary Examiner

R. F. GNUSE, Assistant Examiner